Aug. 4, 1931.  A. REDLER  1,817,647
CONVEYER
Filed Oct. 21, 1929  2 Sheets-Sheet 1
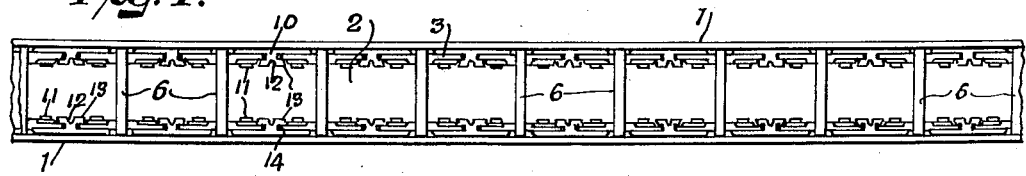
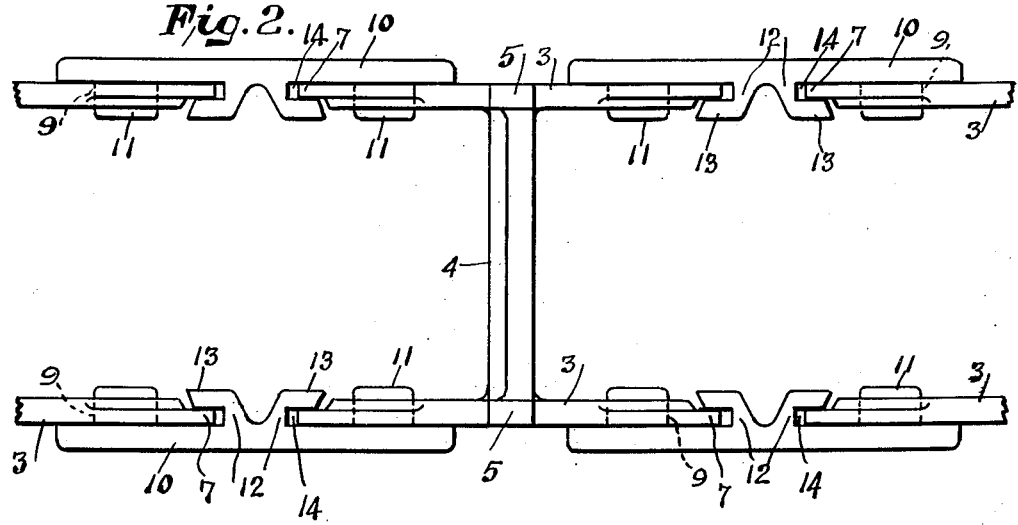
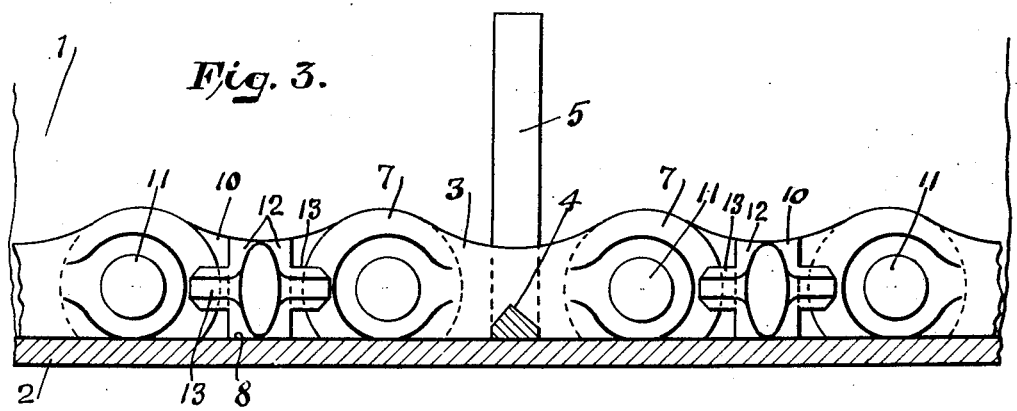
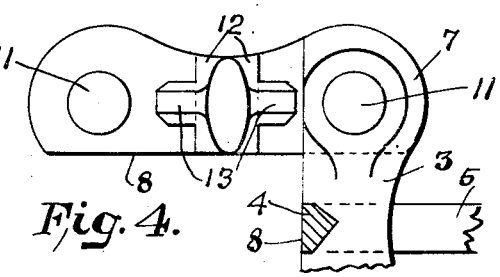
Inventor
ARNOLD REDLER,
By
Toulmin + Toulmin
Attorneys Aug. 4, 1931. A. REDLER 1,817,647
CONVEYER
Filed Oct. 21, 1929 2 Sheets-Sheet 2

Inventor
ARNOLD REDLER,
By Toulmin & Toulmin
Attorneys

Patented Aug. 4, 1931

1,817,647

UNITED STATES PATENT OFFICE

ARNOLD REDLER, OF FLOUR MILLS, SHARPNESS DOCKS, ENGLAND

CONVEYER

Application filed October 21, 1929, Serial No. 401,169, and in Great Britain October 31, 1928.

This invention relates to improvements in conveyers, and particularly to improvements in means for attaching chain units to each other so that these units may be easily detached and at the same time be secure while they are attached, and will not become detached during the operation of the conveyer. It is the purpose to provide a chain composed of detachable units adapted to be used in connection with conveyer chutes and troughs for the purpose of conveying materials of various kinds, particularly in bulk.

It is another object of this invention to provide a conveyer chain of which the chain units are composed of longitudinal links united by cross bars. These cross bars may be accompanied by perpendicular side bars and an arch bar parallel to the cross -bar. These bars form the transporters of the chain, and may engage the four sides of a conveyer chute for the purpose of conveying loose materials through the chute in bulk. One end of the conveyer chute is inserted in a mass of material through which the conveyer chain passes, and picks up part of the material in the mass and conveys it through the chute and out at the other end thereof.

When the chute is closed on all sides the material may be conveyed vertically. In thus conveying the material each one of the open transporters, which are in series along the chain, is assisted by the succeeding transporter, and the parts of the material carried thereby and by the whole mass of material from which the conveyed material is taken. When the chute is open on one side and is used for conveying loose material, it may be tilted at an angle to the horizontal substantially equal to the angle of repose of the material being conveyed. The angle of repose varies with different loose materials and is the angle any side of a pile of any material makes with the horizontal support of the material.

One of the particular advantages of a chain of this kind is the length may be varied by simply removing one or more parts thereof. This can be easily done by simply displacing the links so that they may become disengaged or detached. This engagement and disengagement may be accomplished in the minimum of time, and after the parts have been replaced the chain is absolutely safe and secure from detachment or disengagement during operation.

These and other advantages will appear in connection with the drawings and the following description.

Referring to the drawings:

Figure 1 is a top plan view of a trough or chute with the top removed showing the chain of the present invention applied thereto.

Figure 2 is a top plan view of a section of chain showing the particular form of connecting links adapted to be attached to and detached from the side links.

Figure 3 is a longitudinal vertical section with a part of the conveyer shown in Figure 2.

Figure 4 is a view showing the position of a side link and a connecting link when they are to be detached or when they are being engaged with each other.

Figure 5:
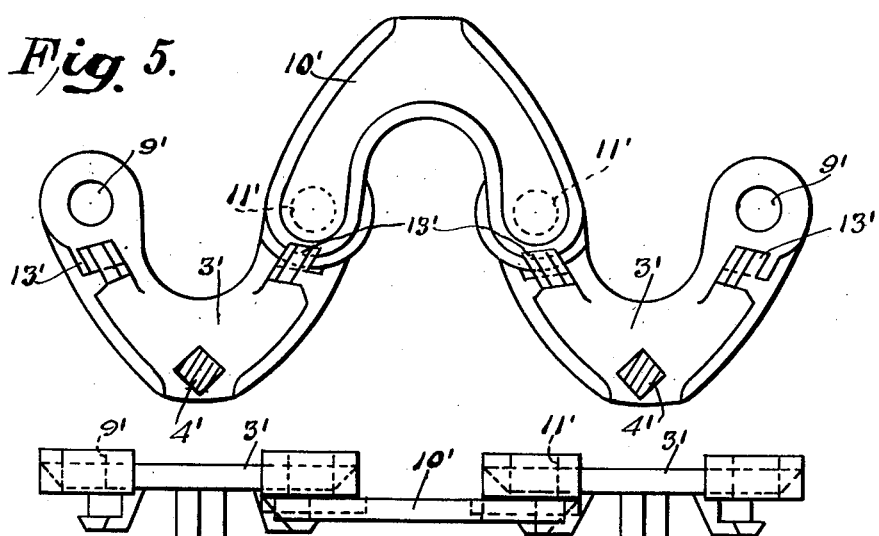
Figure 5 is a plan view of a modified form of link unit, in which the units are to be attached to each other.

In Figure 1 applicant's device is shown applied to a box conveyer. This box or chute is rectangular in shape and may be closed on all four sides, while it is here shown with the top removed. When material is being conveyed in a horizontal or a slightly inclined way the top may be omitted, but for the purpose of conveying material in a substantially vertical path it is necessary that the chute or box have four sides.

The sides of the box or chute are indicated by the numeral 1. The bottom is indicated by the numeral 2. In the conveyer chain adapted to be used in connection with the chute here shown the side links are indicated by the numeral 3. Each chain unit as here shown consists of two side links united by a cross bar 4.

Extending up from each end of the cross bar and from the center of each side link and in either direction therefrom, is a side bar 5. The height of the side bar is substantially the same as the length of the cross bar. However, the relative lengths of these members may be varied. These bars form transporters that sweep the sides of the conveyer chute.

Extending across and connecting the outer ends of the side bars of each chain unit is an arch bar 6 which is of the same length as the cross bar 4. Each end of each side link is enlarged and circular, as shown in Figures 3 and 4. These circular ends are indicated by the numeral 7 and have one side thereof cut down, as indicated by the numeral 8, so that this side of the end of the link is in line with the link on this side.

On each end of each side link there is a hole 9. This hole, as is shown by Figure 4, is nearer the flat side 8 of the link than it is the circular part indicated by the numeral 7. For the purpose of uniting or joining two adjacent ends of two consecutive link chain units there is provided connecting links 10. On each end of each connecting link there is a lug 11 which is adapted to engage in the hole 9 in the ends of the side links. These lugs are of sufficient length to pass well through these holes so as to make it more difficult to remove the connecting link from the side links.

In the central part of the connecting link and on the side from which the lugs project there are projections 12. There are two of these projections, each one having extending therefrom a flange 13. These flanges extend toward the ends of the connecting link. Between the flanges and the body of the link there is a space 14. This space is adapted to receive the ends of the side links when the connecting link is used for the purpose of uniting the chain units to form a complete chain.

For the purpose of uniting the chain units by means of the connecting link the projections in the connecting links are placed within the holes in the ends of the side links while the side links are at a right angle to the connecting links. In this position the flanges will pass by the flat part 8 of the ends of the side links so that the ends of the connecting links will engage the ends of the side link. After the parts have been placed in this position they are brought to a substantially straight-line position, and in this position the flanges will engage on the outside of the circular ends of the side links so that the two are firmly held together for the purpose of forming a safe and unitary chain structure. The parts are maintained in this united position until the links are brought to a right angle to each other, when the flanges are adjacent the flat part of the side links. In this position the parts may be removed from each other so that more links can be formed into the chain, or part of the links may be removed and the other remaining parts united to form a continuous chain. When the chain is in the chute the side walls of the chute, in cooperation with the chain units, will retain the conecting links in place.

Figure 6:
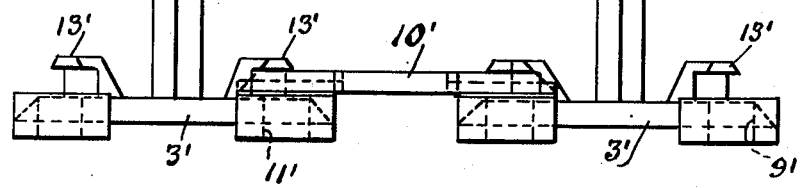
Figure 6 is a side view of the link unit shown in Figure 5.

In Figures 5 to 8, inclusive, are shown modified forms of link units, and a modified form of link connection. The forms shown in Figures 5 and 6 are of the same general structure as the forms shown in Figures 2 and 3, but instead of being straight the chain units here are U-shaped and the connecting links are also U-shaped, and instead of having the flanges for uniting the connecting links to the chain units on the connecting links, the flanges are here on the chain units.

The chain unit here is designated by the numeral 3'. The cross bar is indicated by the numeral 4'. The holes in the ends of the connecting units are indicated by the numeral 9', and the flanges cooperating with the ends of the chain units are indicated by the numeral 13'. The connecting link is indicated by the numeral 10' and has on its ends lugs 11' adapted to fit within the holes 9'. The rounded ends of the connecting links fit between the flanges 13' and the body of the side of the chain unit.

Figure 7:
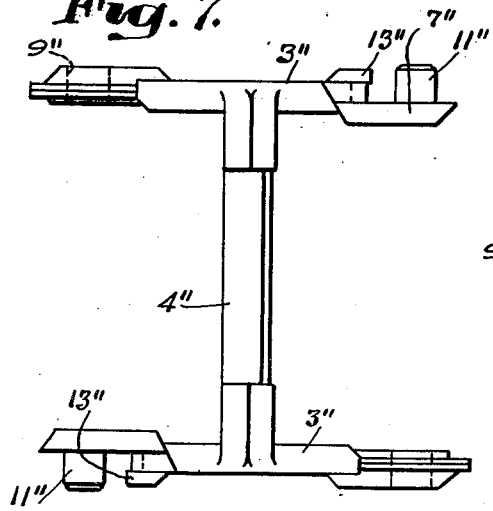
Figure 7 is a plan view of another form of link unit and connecting link.
Figure 8:
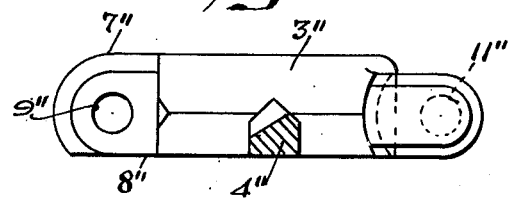
Figure 8 is a sectional view of the form shown in Figure 7.

In Figures 7 and 8 there is a form of chain very similar to that shown in Figures 2 and 3, the difference being that in this form there is needed no connecting link, but one end of the side bar of the link is formed with a lug 11'' that engages a hole 10'' in an adjacent link. It is therefore apparent that each of the members 3'' of this link unit has on one end a lug 11'' and in the other end a hole 9'', which is adapted to engage a lug 11'' on an adjacent link unit. This chain also has the side flanges 13'' that engage a rounded end of the adjacent side of the link unit.

The bars 5 may be omitted or they may be made to extend in either direction from the side bars 3. The arch bar 6 may also be omitted, or may be used where it would not interfere with the sprocket wheels that operate the chain as a whole.

The angle of repose for any loose material is the angle formed by the horizontal support of the material and a line drawn from the apex of a cone-shaped pile of this material to the perimeter of the base thereof. This cone-shaped pile is formed by pouring the material on a horizontal surface, letting the loose material roll down the sides thereof until it reaches a state of rest. In this condition the angle of the side of this material to its supporting surface is its angle of repose.

It is obvious in a structure of this kind that the chain length may be modified merely by removing one or more of the chain units. This modification or change by a removal of the chain units may be done in a minimum of time, the time required for this change being negligible.

It will also be observed that this chain may be made of any kind of metal, is easily manufactured and easily built into a chain after the parts have been manufactured. A person of practically no skill can remove and substitute parts. Another advantage of this chain is that worn parts may be replaced by new and unworn parts.

I desire to comprehend within my invention such modifications as may be clearly embraced within my claims and the scope of my invention.

Having thus fully described my invention, what I claim as new and desire to secure by Letters Patent, is:

1. In a conveyer chain, a plurality of chain units, means connecting two successive units to form them into a chain formation, and co-engaging means on the ends of said units and intermediate the ends of said connecting means to hold them in engagement with each other as long as they are in substantial alignment.

2. In a conveyer chain, a plurality of chain units having circular end flanges with one side flat and in line with one side of said unit, means connecting the adjacent ends of consecutive units, and means on said connecting means engaging said circular ends to prevent the detachment of said units as long as said last means engages the circular parts of said circular ends.

3. In a conveyer chain, a plurality of links having circular ends, said links having a hole at each end nearer one side thereof than the end, a detachable connecting link having means on the ends thereof to engage the side links and fit in the holes thereof, and means on said connecting link to engage the circular ends of said side links to hold the links united until the side link and the connecting links are brought substantially at right angle to each other.

4. In a conveyer chain, a plurality of links having circular ends, said links having a hole at each end nearer one side than the end thereof, a detachable connecting link having means on the ends thereof to engage the side links and fit in the holes thereof, and flanges on said connecting link to engage the circular ends of said side links to hold the links united until the links are moved in relation to each other to bring the flanges adjacent one of the sides of the side links.

5. In a conveyer chain, a plurality of link units, each unit consisting of a pair of side bars joined by a cross bar, said side links having circular ends with holes therein nearer one side than the end, detachable connecting links having means on the ends thereof to engage the side links and fit in the holes thereof, and a pair of outwardly turned flanges on each connecting link to engage the circular ends of said side links to hold the links united until the links are moved in relation to each other to bring the flanges adjacent one of the sides of the links.

6. In a chain conveyer adapted to travel in a conveyer trough, the combination with a plurality of conveyer units having transversely disposed conveyer bars and side members adapted to travel along said trough, articulating members connecting said side members, and co-engaging means on said articulating and side members, said means being located respectively on the ends of one set of members and intermediate the ends of the other set.

7. In a chain conveyer adapted to travel in a conveyer trough, the combination with a plurality of conveyer units having transversely disposed conveyer bars and side members adapted to travel along said trough, articulating members connecting said side members, and co-engaging means on said articulating and side members, said means being located respectively on the ends of one set of members and intermediate the ends of the other set, said co-engaging means having discontinuous portions relatively located whereby engagement obtains while said members are in substantial alignment and are in disengaging position when said members have a material angular inclination.

8. In a chain conveyer adapted to travel in a conveyer trough, the combination with a plurality of conveyer units having transversely disposed conveyer bars and side members adapted to travel along said trough, articulating members connecting said side members, said side members being provided with perforated circular ends, means on said articulating members for engaging said perforations, and additional means intermediate the ends of said articulating members for engaging with said circular ends and retain them in place when said members are in substantial alignment.

9. In a chain conveyer adapted to travel in a conveyer trough, the combination with a plurality of conveyer units having transversely disposed conveyer bars and side members adapted to travel along said trough, articulating members connecting said side members, said side members having perforated circular ends, means on said articulated members to engage with said perforations, and additional means intermediate the ends of said articulating members for engaging said circular ends to retain said members in articulated relation, said circular ends and intermediate engaging means being discontinuous at predetermined points to which they move for disengagement when said members are relatively at right angles.

In testimony whereof, I affix my signature.

ARNOLD REDLER.